Sept. 24, 1929.  C. H. LAND  1,729,391
VEHICLE BRAKE
Filed Nov. 10, 1928  2 Sheets-Sheet 1
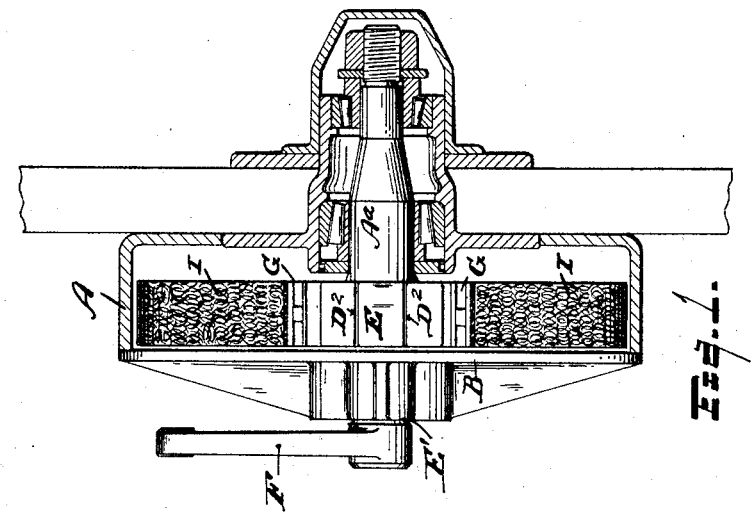
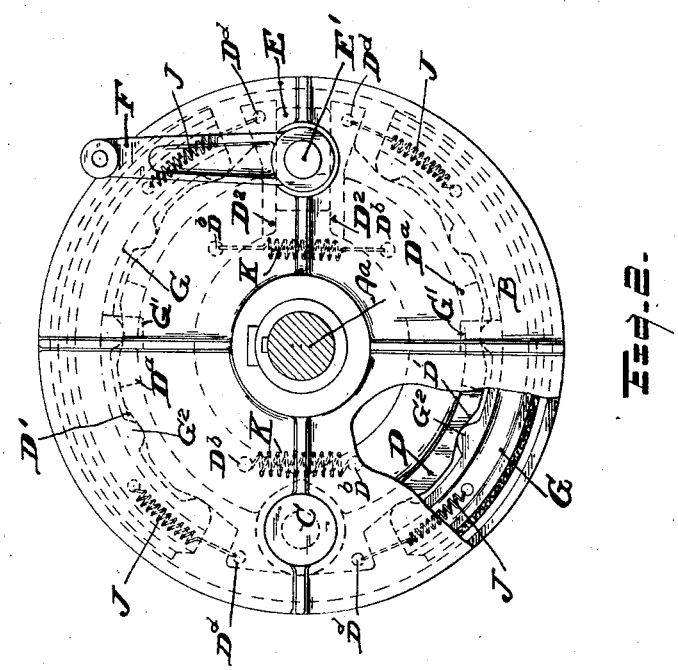
Inventor
Charles H. Land
By S. E. Thomas
Attorney

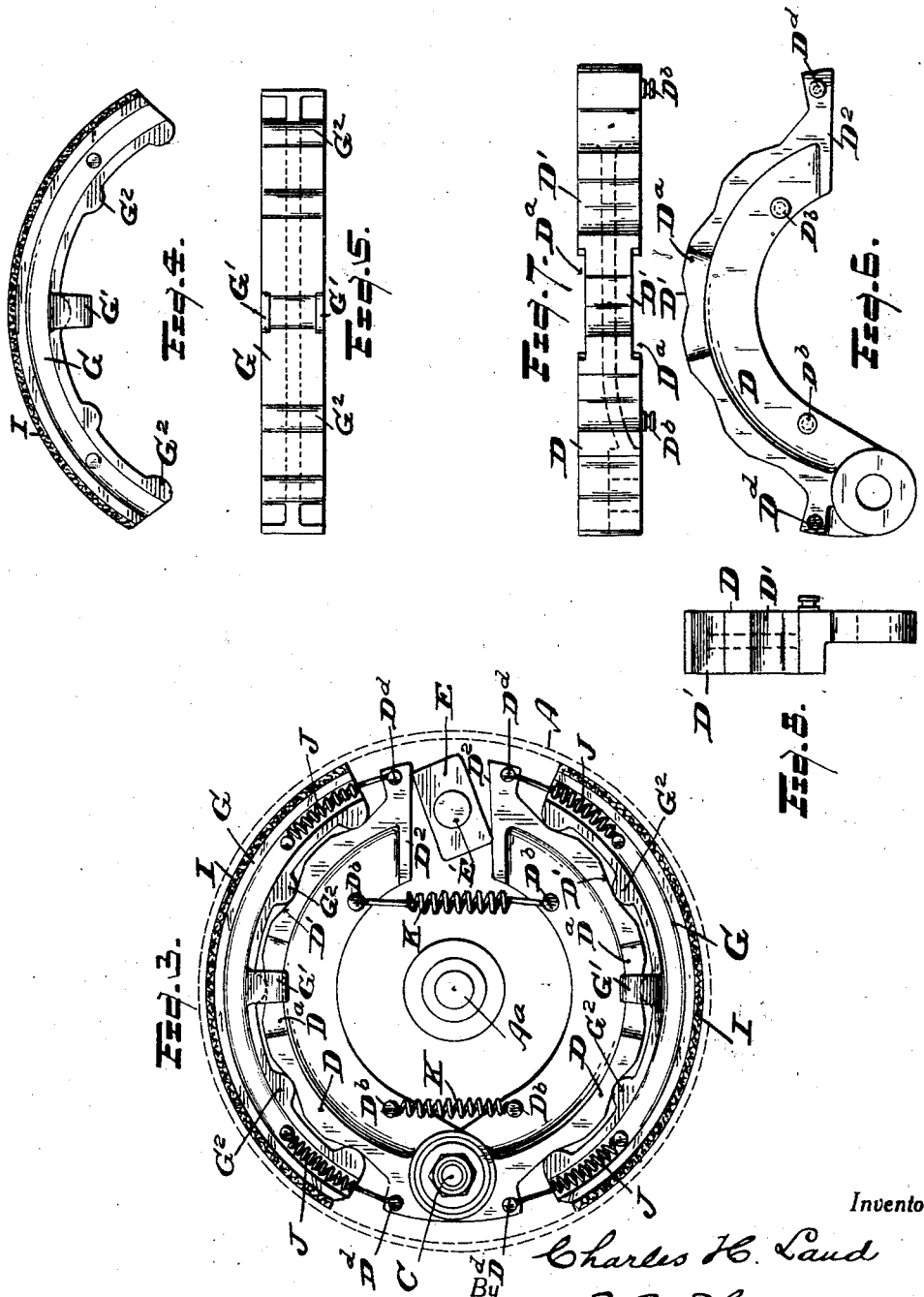

Patented Sept. 24, 1929

1,729,391

UNITED STATES PATENT OFFICE

CHARLES H. LAND, OF DETROIT, MICHIGAN

VEHICLE BRAKE

Application filed November 10, 1928. Serial No. 318,345.

This invention relates to an improvement in brakes of the internal expanding type as applied to motor vehicles.

The primary object of this invention is to provide means whereby the momentum of the moving vehicle is utilized for more effective braking power.

A further object of the invention is to provide a mechanism whereby the brake shoes are automatically applied with gradually increasing braking force following a pedal pressure sufficient to cause the brake shoes to impinge upon the brake drum.

Another object of the invention is to provide an energizing braking mechanism, the construction being such that it is not subject to locking or jamming when the pedal pressure is released.

A further object of the invention is to distribute the wear uniformly over the entire brake lining area.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a fragmentary cross-sectional view through the brake drum and the hub as applied to the wheel of the vehicle.

Figure 2 is a face view of the brake drum at right angles to Figure 1 looking toward the spider plate covering the drum, with a portion of the spider plate broken away showing the shoes and their controlling mechanism in a non-braking position.

Figure 3 is a similar elevation with the spider plate removed showing the mechanism in a braking position.

Figure 4 is a detail of one of the brake shoes.

Figure 5 is a plan view looking toward the concave face of the brake shoe.

Figure 6 is a side elevation of one of the levers for operating the brake shoes.

Figure 7 is a plan view looking toward the V-shaped depressions on the concave face of the lever,—showing in dotted lines the web of the latter.

Figure 8 is an end view looking toward the hub end of the lever, and in dotted lines the stiffening web.

Referring now to the letters of reference placed upon the drawings:

A denotes a brake drum bolted to the spokes of a motor driven vehicle and $A^a$, the axle of the vehicle to which a spider plate B is secured. Pivoted upon a bearing pin C in the plate B are two levers D, D of T-shape form in cross-section, their relatively broad outer surfaces provided with inclined wedge-shaped depressions $D^1$, at definitely spaced intervals. The levers D at their free ends are provided with relatively broad flanges $D^2$, spaced apart to receive between their opposing faces a cam E, pivoted at $E^1$ to the spider plate.

Keyed to the cam E is an operating lever F connected in the usual manner by suitable rods and levers—not shown—with the brake controlling pedal in the cab of the motor vehicle.

Floating on the levers D, D are shoes G, G of H-shape form in cross-section,—covered with a brake lining I on the outer face.

J, J are coiled springs secured at one end to the shoes G and at the other end to posts $D^d$ on the levers D, to hold the shoes in contact with the levers.

The levers D, D are normally drawn toward each other out of braking action with the shoes G, by springs K, K secured at opposite ends to posts $D^b$ on the respective levers. Projecting from the shoes G, G are lugs $G^1$ extending into recesses $D^a$, former in the wall of the levers D on opposite sides of the latter.

On the concave faces of the shoes G are lugs $G^2$, of either an arc or wedge-shape form, projecting into the inclined recesses $D^1$ on the face of the levers.

Having now indicated the several parts by reference letters, the construction and operation of the device will be readily understood.

The brake lever F is actuated from the cab of the vehicle through the usual connection rods and levers with a pedal, (not shown) manually operated by the driver's foot. Upon rocking the lever F, the cam E is tilted thereby expanding the levers D, D carrying outwardly the shoes G, G with the arc-shape lugs L of the latter extending into the wedge-shaped depressions formed by opposing inclined-ways in the outer surface of the levers, until forced into contact with the rotatable drum. Immediately following a pedal pressure sufficient to cause the shoes to impinge upon the flange of the drum, the lugs $G^2$ of the shoe will ride up the inclined-ways into braking engagement with the rotating drum.

The extent of this braking however is controlled by the lugs $G^1$ on the shoe contacting with the shoulders formed by the recesses $D^a$ in the wall of the levers D, on opposite sides of the latter. It is apparent that no locking action between the shoes, brake drum, and levers can occur that would prevent the instant release of the brake mechanism upon the driver removing his foot from the operating pedal. In other words the outward thrust of the shoes into contact with the brake drum, causing the shoes to travel up the inclined ways formed in the levers is limited by the lugs $G^1$ contacting with the shoulders formed by the recesses $D^a$. Thus no locking or jamming action can result as the shoes cannot ride beyond the inclined ways onto the outer face of the lever and between the latter and the brake drum.

While the present embodiment shows the expansible elements or levers D manually operated, it will be obvious that mechanical or other means may be employed to effect this result without departing from the spirit of the invention.

Having thus described my invention, what I claim is:

1. In a device of the character described, a revolvable brake drum, a pair of rocking levers pivoted within the drum, formed with a plurality of wedge-shaped depressions having outwardly inclined ways; floating shoes located between the levers and the wall of the drum having projections extending into the wedge-shaped recesses of the rocking levers; a manually operated rocking cam pivoted between the levers, adapted when rocked to force the levers outwardly in opposite directions, whereby the shoes may be shifted from a normally released position into impinging contact with the brake drum and thereby automatically drag the shoes up the inclined ways of the levers to secure an intensified braking action without further manual effort.

2. In a device of the character described, a revolvable brake drum, a pair of rocking levers pivoted within the drum, formed with a plurality of wedge-shaped depressions having outwardly inclined ways; floating shoes located between the levers and the wall of the drum having projections extending into the wedge-shaped recesses of the rocking levers; a manually operated rocking cam pivoted between the levers, adapted when rocked to force the levers outwardly in opposite directions, whereby the shoes may be shifted into impinging contact with the brake drum to automatically drag the shoes up the inclined ways of the levers to secure an intensified braking action without further manual effort; and means for limiting the outward drag of the shoes on the inclined ways of the levers, whereby the shoes will not become jammed between the levers and the brake drum.

3. In a device of the character described, a revolvable brake drum, a pair of rocking levers pivoted within the drum, formed with a plurality of wedge-shaped depressions having outwardly inclined ways, also recesses on opposite sides of the lever; floating shoes located between the levers and the wall of the drum having projections extending into the wedge-shaped recesses of the rocking levers, also lugs projecting into the recesses on opposite sides of the rocking levers, to secure the shoes against locking; a manually operated rocking cam pivoted between the levers, adapted when rocked to force the levers outwardly in opposite directions, whereby the shoes may be shifted into impinging contact with the brake drum to automatically drag the shoes up the inclined ways of the levers to secure an intensified braking action without further manual effort.

In testimony whereof, I sign this specification.

CHARLES H. LAND.